United States Patent (10) Patent No.: US 7,573,662 B2
Sakata et al. (45) Date of Patent: Aug. 11, 2009

(54) MOVEMENT PREVENTING STRUCTURE FOR COLOR SEPARATION PRISM

(75) Inventors: Noriaki Sakata, Tokyo (JP); Kazuyoshi Kiga, Tokyo (JP); Tadasu Kobayashi, Saitama (JP)

(73) Assignees: Sony Corporation, Tokyo (JP); Fujinon Corporation, Saitama (JP)

( * ) Notice: Subject to any disclaimer, the term of this patent is extended or adjusted under 35 U.S.C. 154(b) by 0 days.

(21) Appl. No.: 12/129,488

(22) Filed: May 29, 2008

(65) Prior Publication Data

US 2008/0297926 A1 Dec. 4, 2008

(30) Foreign Application Priority Data

May 30, 2007 (JP) ............... 2007-143375

(51) Int. Cl.
*G02B 5/04* (2006.01)
(52) U.S. Cl. ...................................... 359/833
(58) Field of Classification Search .......... 359/831–837
See application file for complete search history.

(56) References Cited

U.S. PATENT DOCUMENTS 5,066,101 A * 11/1991 Aoki et al. .................. 359/833

FOREIGN PATENT DOCUMENTS

JP 7-306349 A 11/1995

* cited by examiner

Primary Examiner—Euncha P Cherry
(74) Attorney, Agent, or Firm—Birch, Stewart, Kolasch & Birch, LLP

(57) ABSTRACT

A movement preventing structure for a color separation prism prevents or reduces the movement in an optical axis direction of the color separation prism caused by the thermal expansion or contraction of a color separation prism supporting member. In the movement preventing structure for a color separation prism, in which the movement in an optical axis direction of the color separation prism is prevented by the thermal expansion or contraction of the color separation prism supporting member which supports the color separation prism arranged between a mount part, on which a lens apparatus is detachably mounted, and a solid-state image sensing element of a camera apparatus having the mount part and the solid-state image sensing element, the movement preventing structure has a color separation prism movement preventing member being formed of a thermally-expanding material, having a first fixing part fixed to the color separation prism and a second fixing part fixed to the color separation prism supporting member, and the length in an optical axis direction thereof being changed by thermal expansion or contraction; the color separation prism supporting member supports the color separation prism so that the color separation prism is movable in an optical axis direction; and the length in an optical axis direction of the color separation prism movement preventing member is changed by thermal expansion or contraction, and the color separation prism movement preventing member applies a force to the color separation prism fixed in the first fixing part, whereby the color separation prism is moved in the direction reverse to the direction of the movement of the color separation prism caused by the thermal expansion or contraction of the color separation prism supporting member.

2 Claims, 3 Drawing Sheets

MOVEMENT PREVENTING STRUCTURE FOR COLOR SEPARATION PRISM

BACKGROUND OF THE INVENTION

1. Field of the Invention

The present invention relates to a movement preventing structure for a color separation prism, and more particularly, to a movement preventing structure for a color separation prism which is applied to a camera apparatus having the color separation prism supported by a color separation prism supporting member whose length in an optical axis direction is changed by thermal expansion or contraction.

2. Description of the Related Art

Conventionally, there has been known various types of camera apparatuses for motion picture photography, each of which has a color separation prism supported by a color separation prism supporting member. The camera apparatus of this type has a problem in that the color separation prism supporting member thermally expands or contracts due to a change in outside air temperature at the time of photographing, and thereby the color separation prism is moved in an optical axis direction. There has been proposed a flange focal distance adjustment mechanism for always keeping a flange focal distance constant regardless of the change in ambient temperature (For example, refer to Japanese Patent Application Laid-Open No. 7-306349).

In the mechanism described in Japanese Patent Application Laid-Open No. 7-306349, the interval between a light receiving member attaching surface and a butting surface of a lens held by a lens frame, that is, the flange focal distance of lens is adjusted to a predetermined distance by urging the lens frame to position it at a predetermined position. Therefore, there arises a problem in that even if this mechanism is applied to various types of camera apparatuses for motion picture photography, each of which has a color separation prism supported by the color separation prism supporting member, the movement of the color separation prism cannot be prevented.

SUMMARY OF THE INVENTION

The present invention has been made in view of the above circumstances, and accordingly an object thereof is to provide a movement preventing structure for a color separation prism which prevents or reduces the movement in an optical axis direction of the color separation prism caused by the thermal expansion or contraction of a color separation prism supporting member.

A first aspect of the present invention provides a movement preventing structure for a color separation prism, in which the movement in an optical axis direction of the color separation prism is prevented, the color separation prism being arranged between a mount part, on which a lens apparatus is detachably mounted, and a solid-state image sensing element of a camera apparatus having the mount part and the solid-state image sensing element, comprising:

a color separation prism supporting member supports the color separation prism so that the color separation prism is movable in an optical axis direction; and a color separation prism movement preventing member being formed of a thermally-expanding material, having a first fixing part fixed to the color separation prism and a second fixing part fixed to the color separation prism supporting member, and the length in an optical axis direction thereof being changed by thermal expansion or contraction;

wherein the length in an optical axis direction of the color separation prism movement preventing member is changed by thermal expansion or contraction, and the color separation prism movement preventing member applies a force to the color separation prism fixed in the first fixing part, so that the color separation prism is moved in the direction reverse to the direction of the movement of the color separation prism caused by the thermal expansion or contraction of the color separation prism supporting member.

According to the first aspect of the present invention, since the color separation prism movement preventing member is formed of a thermally-expanding material, if the outside air temperature etc. change at the time of photographing, the color separation prism movement preventing member thermally expands or contracts and therefore the length in an optical axis direction thereof changes, by which a force is applied to the color separation prism. Thereby, the color separation prism to which this force is applied is moved in the direction reverse to the direction of the movement of the color separation prism caused by the thermal expansion or contraction of the color separation prism supporting member with respect to the color separation prism supporting member. That is to say, the movement of the color separation prism caused by the thermal expansion or contraction of the color separation prism supporting member is canceled by the movement in the reverse direction of the color separation prism caused by the thermal expansion or contraction of the color separation prism movement preventing member. Thereby, the movement in an optical axis direction of the color separation prism caused by the thermal expansion or contraction of the color separation prism supporting member can be prevented or reduced.

Also, a second aspect of the present invention is characterized in that, in the first aspect of the present invention, the length in an optical axis direction of the color separation prism movement preventing member is set so that the distance of movement of the color separation prism caused by the thermal expansion or contraction of the color separation prism movement preventing member and the distance of movement of the color separation prism caused by the thermal expansion or contraction of the color separation prism supporting member are approximately equal to each other.

According to the second aspect of the present invention, since the length in an optical axis direction of the color separation prism movement preventing member is set so that the distance of movement of the color separation prism caused by the thermal expansion or contraction of the color separation prism movement preventing member and the distance of movement of the color separation prism caused by the thermal expansion or contraction of the color separation prism supporting member are approximately equal to each other, the movement in an optical axis direction of the color separation prism caused by the thermal expansion or contraction of the color separation prism supporting member can further be prevented or reduced.

According to the present invention, the movement in an optical axis direction of the color separation prism caused by the thermal expansion or contraction of the color separation prism supporting member can be prevented or reduced.

DETAILED DESCRIPTION OF THE PREFERRED EMBODIMENTS

A movement preventing structure for a color separation prism in accordance with one embodiment of the present invention will now be described with reference to the accompanying drawings.

Figure 1:
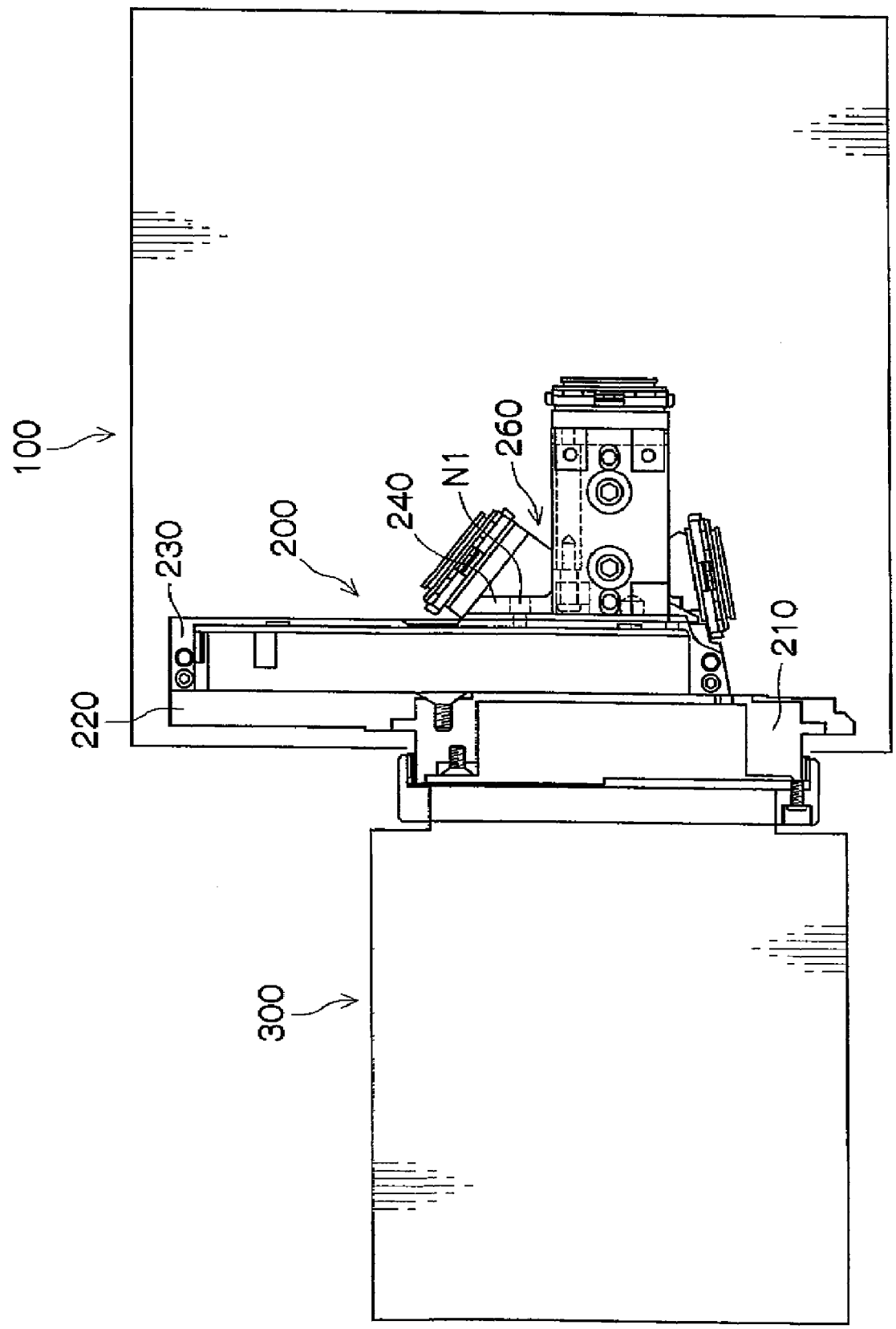
FIG. 1 is a side view for explaining a camera apparatus body to which a movement preventing structure for a color separation prism in accordance with one embodiment of the present invention is applied, and a lens apparatus mounted on the camera apparatus body.
Figure 2:
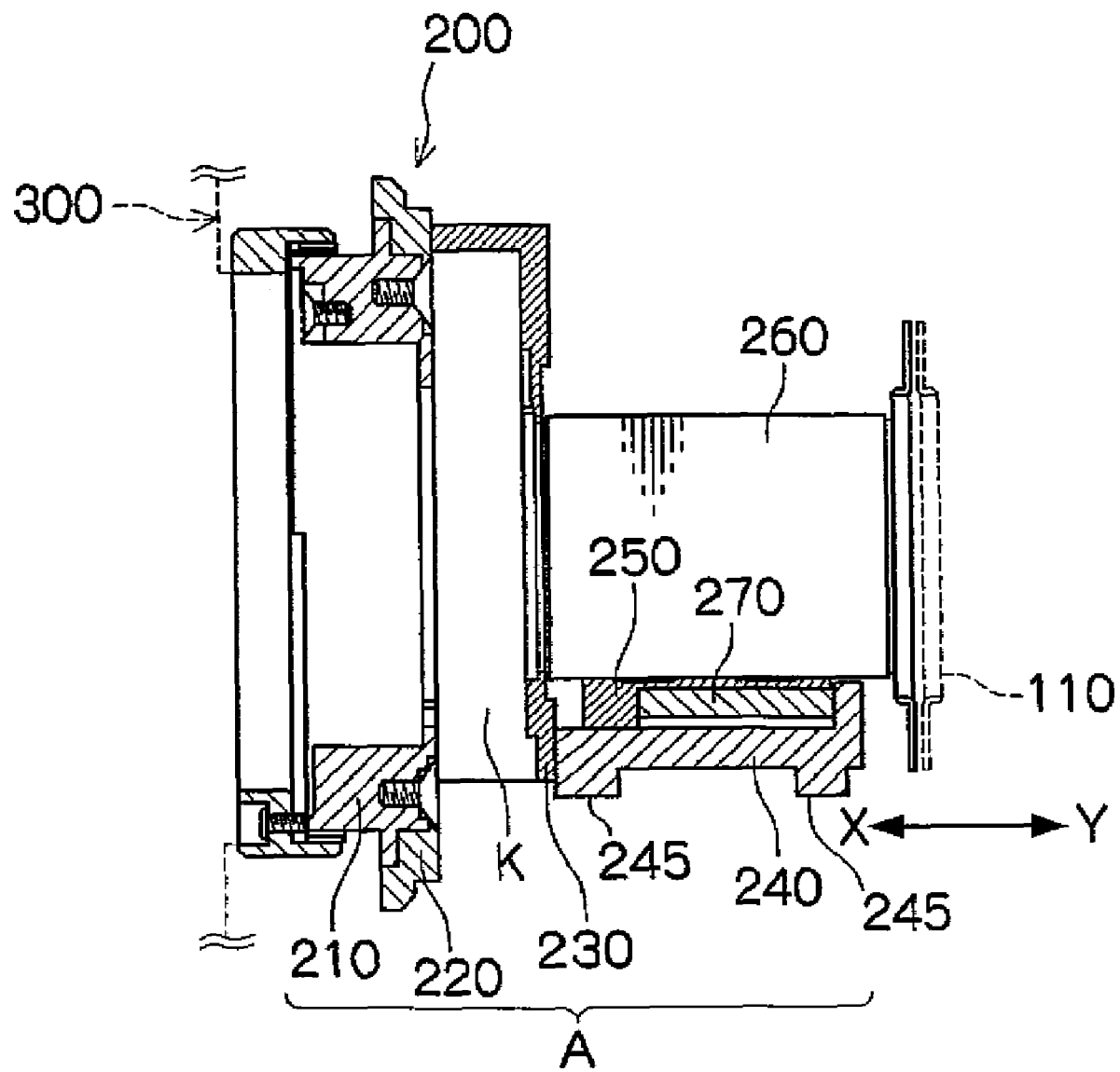
FIG. 2 is a sectional view for explaining the configuration of a color separation prism unit mounted on the camera apparatus body shown in FIG. 1.

FIG. 1 is a side view for explaining a camera apparatus body to which the movement preventing structure for a color separation prism in accordance with one embodiment of the present invention is applied, and a lens apparatus mounted on the camera apparatus body. FIG. 2 is a sectional view for explaining the configuration of a color separation prism unit mounted on the camera apparatus body shown in FIG. 1.

As shown in FIG. 1, the movement preventing structure for a color separation prism of this embodiment is applied to the color separation prism unit 200, which is mounted on the camera apparatus body 100 by screwing etc., or the like.

The color separation prism unit 200 is a unit that is fixed at a predetermined location of the camera apparatus body 100 by screwing etc. to form a part of the camera apparatus. As shown in FIG. 2, the color separation prism unit 200 includes a mount part 210 on which a lens apparatus 300 is detachably mounted, a unit body 220 provided with the mount part 210, a filter housing 230 that is fixed to the unit body 220 and is formed with a space K in which a filter such as an ND filter is mounted between the filter housing 230 and the unit body 220, a first bracket 240 threadedly fixed to the filter housing 230 by screws N1, a second bracket 250 supported by a color separation prism supporting member A (the mount part 210, the unit body 220, the filter housing 230, and the first bracket 240), a color separation prism 260 bondingly fixed to the second bracket 250, shafts 270 (corresponding to a color separation prism movement preventing member of the present invention) each formed by a thermally-expanding member, and the like.

The color separation prism supporting member A is a member for supporting the color separation prism 260, and is formed by the mount part 210, the unit body 220, the filter housing 230, and the first bracket 240. When the color separation prism unit 200 is fixed at a predetermined location of the camera apparatus body 100 by screwing etc., as shown in FIG. 2, the color separation prism 260 supported by the color separation prism supporting member A is arranged between the mount part 210 and a solid-state image sensing element 110 provided on the camera apparatus body 100. Thereby, a predetermined positional relationship is brought about between the mount part 210, the color separation prism, and the solid-state image sensing element 110.

The filter housing 230 and the first bracket 240 each are formed of an alloy of iron with nickel (referred to as Invar) having a relatively low thermal expansion coefficient. However, in terms of cost, the mount part 210 is formed of stainless steel etc. having a relatively high thermal expansion coefficient. Also, the unit body 220 is formed of aluminum etc. having a relatively high thermal expansion coefficient.

As described above, the color separation prism supporting member A includes the members having a relatively high thermal expansion coefficient (in particular, the mount part 210 and the unit body 220). Therefore, if the outside air temperature etc. change at the time of photographing, the color separation prism supporting member A (in particular, the mount part 210 and the unit body 220) thermally expands or contracts and therefore the length in an optical axis direction thereof changes, which moves the color separation prism 260 supported by the color separation prism supporting member A in an optical axis direction (the left direction or the right direction in FIG. 2). For example, if the color separation prism supporting member A thermally expands, the color separation prism 260 moves in the Y direction in FIG. 2. Inversely, if the color separation prism supporting member A contracts, the color separation prism 260 moves in the X direction in FIG. 2.

To prevent the movement in an optical axis direction of the color separation prism 260, the color separation prism unit 200 of this embodiment has a movement preventing structure for the color separation prism 260.

Next, the movement preventing structure for the color separation prism 260 is explained.

Figure 3:
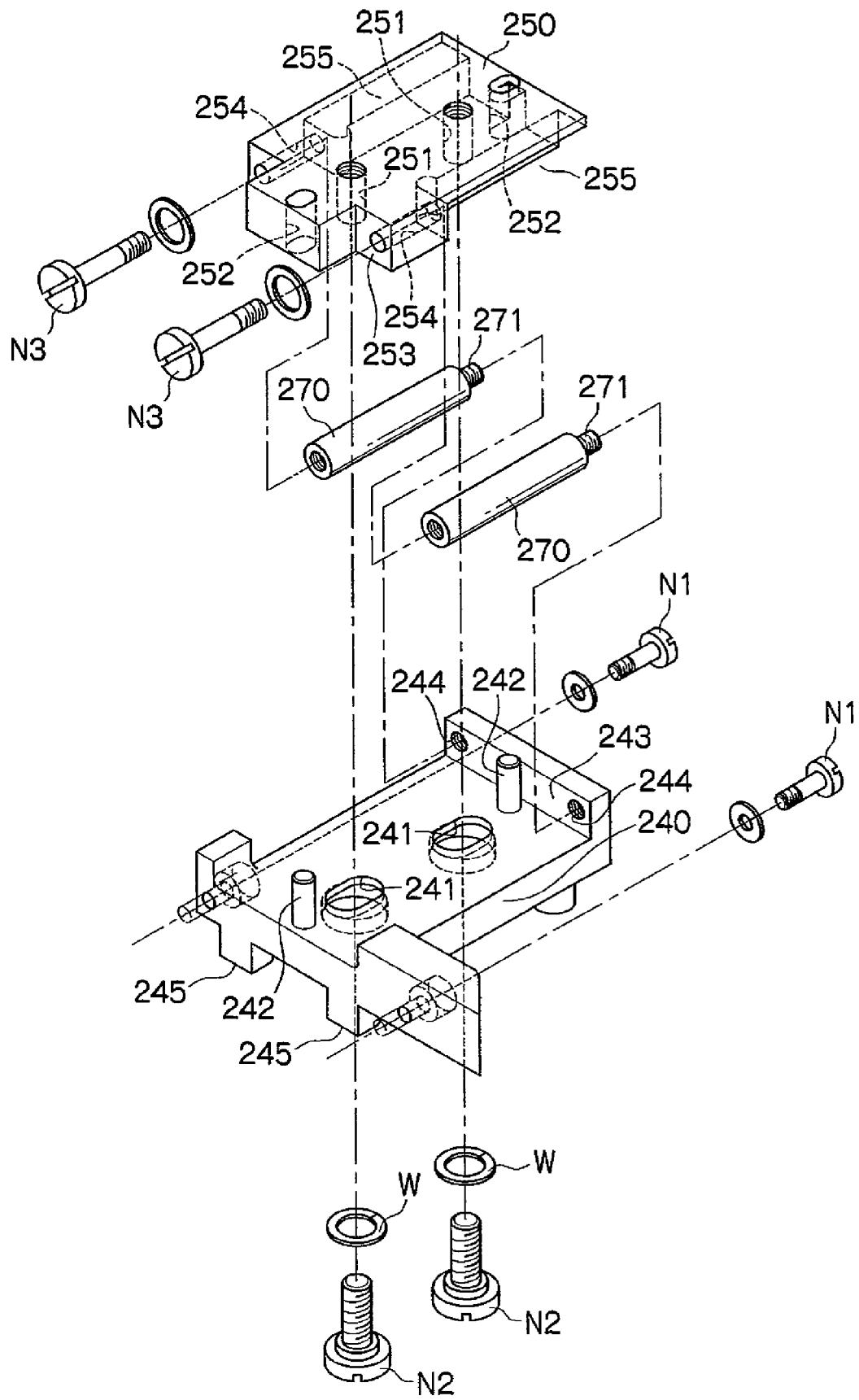
FIG. 3 is an exploded view for explaining a movement preventing structure for a color separation prism 260.

FIG. 3 is an exploded view for explaining the movement preventing structure for the color separation prism 260.

As shown in FIG. 3, the first bracket 240 is formed with two elongated holes 241 that are arranged along an optical axis direction so as to extend in an optical axis direction (elongated holes serving as a device for guiding the movement in an optical axis direction of the second bracket 250 (and the color separation prism 260) and a device for regulating the movement in the direction perpendicular to the optical axis thereof). Screws N2 are inserted into the elongated holes 241 via spring washers W, and are threadedly engaged with threaded holes 251 formed in the second bracket 250. That is to say, as shown in FIG. 2, the first bracket 240 and the second bracket 250 are threadedly engaged with each other by the screws N2. The second bracket 250 is formed of a material having a thermal expansion coefficient equivalent to that of the color separation prism 260.

However, the screws N2 are not screwed completely, so that the second bracket 250 (and the color separation prism 260) is not fixed to the first bracket 240 (the color separation prism supporting member A). That is to say, the first bracket 240 is screwed to the second bracket 250 with a relatively small force. In this state, the spring washer W functions as a spring device for urging the second bracket 250 (and the color separation prism 260) against the first bracket 240 (the color separation prism supporting member S) in the direction perpendicular to the optical axis. That is to say, the second bracket 250 (and the color separation prism 260) is pulled down by the spring action of the spring washers W and becomes in a state of substantially surface contacting with the first bracket 240, and if a certain force is applied to the second bracket 250, the second bracket 250 to which this force is applied can be moved in an optical axis direction by being guided by the elongated holes 241. The second bracket 250 is formed with two positioning pin holes 252 arranged along the optical axis so as to extend in an optical axis direction. By inserting positioning pins 242 provided on the first bracket 240 into the positioning pin holes 252, the positions of screwing using the screws N2 can be determined easily. Since the positioning pin hole 252 is formed into an elongated hole extending in an optical axis direction, the second bracket 250 is not hindered from moving in an optical axis direction.

The shaft 270 is fixed to the first bracket 240 in a posture of being substantially in parallel with the optical axis by threadedly engaging a threaded part 271 at one end thereof (corresponding to a second fixing part of the present invention) with a threaded hole 244 formed in a wall part 243 of the first bracket 240. The shaft 270 is also fixed to the second bracket 250 by threadedly engaging a screw N3, which is inserted into a threaded hole 254 formed in a wall part 253 of the second bracket 250, with the other end thereof (corresponding to a first fixing part of the present invention). On both sides of the second bracket 250 with the optical axis being the center, a space 255 in which the shaft 270 is positioned is formed.

The shaft 270 is formed of a thermally-expanding material (for example, aluminum). Therefore, if the outside air temperature etc. change at the time of photographing, the shaft 270 thermally expands or contracts and therefore the length in an optical axis direction thereof changes, by which a force is applied to the second bracket 250. Thereby, the second bracket 250 (and the color separation prism 260) to which this force is applied is moved in the direction reverse to the direction of the movement of the color separation prism 260 caused by the thermal expansion or contraction of the color separation prism supporting member A. At this time, the second bracket 250 (and the color separation prism 260) is moved in an optical axis direction by being guided by the elongated holes 241.

For example, it is assumed that the color separation prism supporting member A thermally expands, and the color separation prism 260 moves a predetermined distance in the Y direction in FIG. 2. In this case, since the shafts 270 and the color separation prism supporting member A are placed in almost the same temperature environment, the lengths of the shafts 270 are changed by thermal expansion, and the shafts 270 apply a force to the second bracket 250 (and the color separation prism 260), whereby the second bracket 250 (and the color separation prism 260) to which this force is applied is moved a predetermined distance in the X direction in FIG. 2 with respect to the color separation prism supporting member A. The length of the shaft 270 is set so that the distance of movement of the color separation prism 260 caused by the thermal expansion or contraction of the shafts 270 and the distance of movement of the color separation prism 260 caused by the thermal expansion or contraction of the color separation prism supporting member A are approximately equal to each other. In other words, the length of the shaft 270 is set so that the value obtained by multiplying the length in an optical axis direction of the shaft 270 by the linear expansion coefficient thereof and the value obtained by multiplying the length in an optical axis direction of the color separation prism supporting member A by the linear expansion coefficient thereof are approximately equal to each other. Therefore, the movement in the Y direction in FIG. 2 of the color separation prism 260 caused by the thermal expansion of the color separation prism supporting member A is canceled by the movement in the X direction of the color separation prism 260 caused by the thermal expansion of the shafts 270. Thereby, the movement in an optical axis direction of the color separation prism 260 caused by the thermal expansion of the color separation prism supporting member A can be prevented or reduced.

Similarly, it is assumed that the color separation prism supporting member A contracts, and the color separation prism 260 moves a predetermined distance in the X direction in FIG. 2. In this case, since the shafts 270 and the color separation prism supporting member A are placed in almost the same temperature environment, the lengths of the shafts 270 are changed by contraction, and the shafts 270 apply a force to the second bracket 250 (and the color separation prism 260), whereby the second bracket 250 (and the color separation prism 260) to which this force is applied is moved a predetermined distance in the Y direction in FIG. 2. As described above, the length of the shaft 270 is set so that the distance of movement of the color separation prism 260 caused by the thermal expansion or contraction of the shafts 270 and the distance of movement of the color separation prism 260 caused by the thermal expansion or contraction of the color separation prism supporting member A are approximately equal to each other. Therefore, the movement in the Y direction in FIG. 2 of the color separation prism 260 caused by the thermal expansion of the color separation prism supporting member A is canceled by the movement in the X direction in FIG. 2 of the color separation prism 260 caused by the thermal expansion of the shafts 270. Thereby, the movement in an optical axis direction of the color separation prism 260 caused by the contraction of the color separation prism supporting member A can be prevented or reduced. The first bracket 240 is provided with radiation plate attaching parts 245 to which radiation plates (not shown) are fixed by screwing etc.

Next, modifications of this embodiment are explained.

In the above-described embodiment, an example in which the movement preventing structure for a color separation prism is applied to the color separation prism unit 200 has been explained. However, the present invention is not limited to this example. The movement preventing structure for a color separation prism of the above-described embodiment can be applied to all camera apparatuses that have a color separation prism supported by a color separation prism supporting member whose length in an optical axis direction is changed by thermal expansion or contraction.

Also, in the above-described embodiment, the explanation has been that the color separation prism supporting member A is formed by the mount part 210, the unit body 220, the filter housing 230, and the first bracket 240. However, the present invention is not limited to this configuration. For example, the color separation prism supporting member A need not include the filter housing 230. Alternatively, it may include any other element.

Also, in the above-described embodiment, the explanation has been that the mount part 210 is formed of stainless steel, the unit body 220 is formed of aluminum, and the filter housing 230 and the first bracket 240 each are formed of an alloy of iron with nickel (referred to as Invar). However, the present invention is not limited to this configuration. The mount part 210, the unit body 220, the filter housing 230, and the first bracket 240 may be formed of any other material.

The above-described embodiment is merely an example in all respects. The present invention is not construed limitedly by the description of the above-described embodiment The present invention can be carried out in other various modes without departing from the spirit and principal features thereof.

What is claimed is:

1. A movement preventing structure for a color separation prism, in which the movement in an optical axis direction of the color separation prism is prevented, the color separation prism being arranged between a mount part, on which a lens apparatus is detachably mounted, and a solid-state image sensing element of a camera apparatus having the mount part and the solid-state image sensing element, comprising:

a color separation prism supporting member supports the color separation prism so that the color separation prism is movable in an optical axis direction; and a color separation prism movement preventing member being formed of a thermally-expanding material, having a first fixing part fixed to the color separation prism and a second fixing part fixed to the color separation prism supporting member, and the length in an optical axis direction thereof being changed by thermal expansion or contraction;

wherein the length in an optical axis direction of the color separation prism movement preventing member is changed by thermal expansion or contraction, and the color separation prism movement preventing member applies a force to the color separation prism fixed in the first fixing part, so that the color separation prism is moved in the direction reverse to the direction of the movement of the color separation prism caused by the thermal expansion or contraction of the color separation prism supporting member.

2. The movement preventing structure for a color separation prism according to claim 1, wherein the length in an optical axis direction of the color separation prism movement preventing member is set so that the distance of movement of the color separation prism caused by the thermal expansion or contraction of the color separation prism movement preventing member and the distance of movement of the color separation prism caused by the thermal expansion or contraction of the color separation prism supporting member are approximately equal to each other.

* * * * *